3,376,926
METHODS OF PLACEMENT OF LOW pH SILICIC ACID IN CARBONACEOUS GEOLOGICAL FORMATIONS
Homer C. McLaughlin and Ronney R. Koch, Duncan, Okla., assignors to Halliburton Company, Duncan, Okla., a corporation of Delaware
No Drawing. Filed Apr. 18, 1967, Ser. No. 631,585
12 Claims. (Cl. 166—29)

ABSTRACT OF THE DISCLOSURE

This patent describes the method for the placement of a low pH silicic acid in a carbonaceous geological formation.

Background of the invention

The field of this invention relates to the art of sealing or plugging underground formations around wells.

The method of utilizing a silicic acid composition to seal underground formations or plug capillaries employing a silicic acid having a pH of 1.5 or less is described in McLaughlin, et al. application Ser. No. 511,141, filed Dec. 2, 1965, and entitled, "Method of Plugging or Sealing Formations," the disclosure of which is expressly incorporated herein by reference.

Application Ser. No. 511,141 discloses that many of the disadvantages of the prior art methods of chemical grouting with sodium silicate can be obviated by using sodium silicate at a pH of 1.5 or less. The method is particularly useful in secondary recovery waterflood injection wells. Certain geological formations in these injection wells accept far more than their desirable share of injection water and hence are called thief zones. Best results require large volumes of sealing material to be placed or injected within the capillary flow system of the thief zone. Large volumes dictate the use of an economical sealant such as sodium silicate. A considerable number of advantages result from converting the sodium silicate at pH 11 to 13 to silicic acid at pH 1.5 or less.

As is shown in the above identified co-pending application, the alkaline gel time reaches a minimum at a pH of about 7.5. Passing through the relatively neutral regions, the gel time increases as the pH becomes more acid. However, in the region of pH 1.5 or less, the gel time again decreases with increasing amounts of acid.

The use of silicic acid with a pH of about 1.5 or less performs very well in sandstone, gravel-wash, parted shales, and similar type geologic formations. However, in carbonaceous formations, in the performance of the silicic acid, certain difficulties have been encountered. In formations such as dolomite and limestone, the gel time of the silicic acid is reduced. This drastically curtails the available placement time.

For example, when silicic acid is placed in a carbonaceous formation, the acid initially present in order to maintain the pH of about 1.5 or less begins to spend on the carbonate by reaction of the acid with calcium carbonate to yield water and carbon dioxide. Thus, the pH is raised from the desired working range of 0 to 1.5 to a pH of about 3 or 4. The gel time in the pH region of 3 to 4 is extremely short. At the usual temperatures, the gel time at pH 3.5 is approximately 5 to 10 minutes.

Since the total amount of silicic acid placed within the formation is equal to the pump rate, multiplied by the placement time, the volume of silicic acid which can be injected into such formations approaches marginal value. Due to the vugular type of permeabilities normally found in carbonaceous formations, much larger volumes of silicic acid should be injected in order to accomplish the desired result.

The present invention is concerned with the provision of adequate gel time for the silicic acid in carbonaceous formations. More particularly, we have found that a group of strong acids, or precursors of such acids, are effective in holding the pH of the silicic acid low enough in carbonaceous solutions for a sufficient time to complete injection before gellation occurs.

Summary of the invention

Briefly, the present invention comprises a method of plugging or sealing carbonaceous earth formations and the like by forming a silicic acid solution having an initial pH of about 1.5 or less, containing a strong acid or an acid precursor thereof, said strong acid having an ionization constant of from about $1 \times 10^0$ to about $5 \times 10^{-4}$ and being capable of forming an essentially water-insoluble calcium salt, injecting said solution into the earth formation to be sealed, and allowing the silicic acid solution to set into a relatively firm and impermeable mass, thereby sealing the formation.

The invention also comprises preflushing the formation with the above-mentioned strong acids or acid precursors, followed by injection of the silicic acid solutions disclosed in Ser. No. 511,141; that is, solutions which do not contain the strong acids.

This invention further includes the novel silicic acid solutions utilized in the method.

This invention additionally comprises injection into the formation prior to the introduction of the silicic acid solution of a preflush material for the carbonaceous formation.

The strong acids, whether in the silicic acid injection or in a preflush, serve to maintain the initial pH around and below 1.5 in carbonaceous formation without in any way impairing the rheological properties of the silicic acid solution, or effecting the formation of a firm, impervious mass upon gellation.

Accordingly, it is the principal object of the present invention to provide a novel method for the sealing or plugging of carbonaceous formations.

Another object of the present invention is to provide a method of sealing or plugging carbonaceous formations with silicic acid whereby premature gelling is avoided and the placement of the plugging or sealing material can be completed prior to the commencement of gellation.

It is also an object of the invention to provide a novel composition for use in sealing and plugging carbonaceous formations.

These and other objects and advantages of the invention will be apparent from a more detailed description which follows.

Description of preferred embodiments

Basically, the present invention allows an effective volume of silicic acid solution with a pH of less than 1.5 to be placed in a carbonaceous geologic formation, usually limestone or dolomite, before premature gellation can occur. This is accomplished by the combining with the silicic acid having a pH of 1.5 or less, either at the time of injection or prior thereto, a silicic acid soluble strong acid having an ionization constant ($K_a$) in the range of $1 \times 10^0$ to $5 \times 10^{-4}$, and capable of forming an essentially water-insoluble calcium salt in the presence of an acid such as hydrochloric acid, that is, having a solubility at 25° C. of less than about 2 grams per ml. of water, and preferably less than 0.5 gram per 100 ml. of water. These acids form an insoluble calcium salt coating on the formation, slowing further spending of the acid. Typical suitable acids falling within the above classification include citric, oxalic, phosphoric, sulfuric, sulfurous, and tartaric. The preferred is sulfuric acid. It will be understood that any of the above acids can be generated in situ by the addition of a salt or an acid salt of any of the above acids to the acid solution. For example, sodium bisulfate can be added to the silicic acid solution, whereupon sulfuric acid is generated.

When an acid precursor is used, the anion is the significant portion of the molecule. Mere substitution of other cations for sodium does not remove the precursor from the scope of this invention. Thus, ammonium sulfate, potassium acid sulfate or even ferric sulfate can be substituted for sodium acid sulfate. Similarly, there are a considerable number of soluble cation salts of the other disclosed anions such as ammonium phosphate, potassium tartrate, or tetramminecopper II citrate that can be made to serve as well as the sodium salts. Of course, acid salts and combinations of the above cations do not appreciably alter the effect of the anion. In sum, the anion is the operating part of the strong acid or its precursor and almost any conceivable soluble cation combination with the anion will serve the purpose of this invention.

The strong acid is added in an amount effective to maintain the pH of the silicic acid below pH 1.5 during injection. Normally, the minimum effective injection of silicic acid is 75 barrels. At a typical injection rate of 0.5 barrel per minute,, the gel time of the silicic acid must be at least 150 minutes. Using sodium acid sulfate as the strong acid precursor, it has been found that about 1900 pounds of the precursor are required for a 75 barrel injection. Obviously, the amount of strong acid or precursor required in a given treatment is dependent upon the volume of the injection, the injection rate, and the surface area of carbonate formation contacted. Based upon the foregoing criteria, those skilled in the art will be able to readily ascertain the effective amount of strong acid or precursor required to prevent gellation during injection.

The silicic acid solution normally has a pH of less than 1.5 at the time of injection. However, the exact upper limit of the pH value at the time of injection has been found to vary somewhat with the type of silicic acid employed. For example, in some cases, an initial pH of 2.0 will provide an acceptable gel time. Hence, as used herein and in the claims, the expression "an initial pH of about 1.5" includes the use of a slightly higher initial pH where the nature of the silicic acid solution permits. Those skilled in the art may readily determine the precise upper limit of the pH prior to injection for any given silicic acid solution by brief and simple testing.

Upon contact with the carbonaceous formation, the solution will gradually increase in pH. However, the strong acids provide an adequate gel time even in the range of pH 1.5 to 5.0. Thus, this invention comprehends that while the initial silicic acid injection will be at a pH of 1.5 or less, the drifting of the pH eventually up to about pH 5.0 caused by contact with the carbonaceous formation will frequently occur prior to gellation.

The placing of the silicic acid without premature gellation can be further promoted by the treatment of the carbonaceous surface with a preflush fluid, for example an oily fluid such as diesel oil or crude oil, or a surfactant, or especially mixtures thereof. Alternatively, the preflush fluid can comprise an aqueous solution of any of the above-mentioned strong acids or precursors. Using the disclosed strong acids in a preflush and omitting their presence is the silicic acid is of substantial benefit compared to not using the disclosed type strong acids at all. Although the preflush fluids and the disclosed strong acids within the silicic acid solution, used independently, are here shown to be within the scope of this invention, it is hereby recommended and taught that they be used together for maximum benefit.

The silicic acid solution of the present invention must be carefully prepared. The sodium silicate at a pH of 11.5 or more, for example, must be acidified to a pH of 1.5 or less. Any delay in the relatively neutral regions between pH 3 and pH 8 will result in irreversible premature gellation, as the gel time in these regions is only a few seconds. It is therefore essential that the pH be changed from 11.5 or more to pH 1.5 or less as quickly as possible. Normally, the sodium silicate is acidified to form silicic acid of pH 1.5 or less using hydrochloric acid which does not fall within the above indicated class of strong acids since calcium chloride is quite soluble in water. Various mixing techniques are described in the above-identified patent application for the adjustment of the pH of the silicic acid.

The following examples are presented solely to illustrate that the invention should not be regarded as limiting in any way. In these examples, the parts and percentages are by weight unless otherwise indicated.

EXAMPLE 1

In this example, sulfuric acid is generated from sodium bisulfate upon contact with the hydrochloric acid. In limestone used in the test was ¼" limestone chat commonly known as "pea gravel." The acid solubility of the chat was 97%. The test was conducted at 125° F. The treatment material was as follows:

Solution A: 16.7 ml. grade 40 sodium silicate and 33.3 ml. of water for a total volume of 50 ml.
Solution B: Comprised 20° Bé. hydrochloric acid and sodium bisulfate in the amounts indicated plus sufficient water to make a total volume of 50 ml.

The solutions were blended by pouring Solution A into Solution B as described in the above-identified patent application. The effect of varying the amount of hydrochloric acid and sodium bisulfate on the gel time can be seen in the following table:

TABLE I

| 20° Bé. Hydrochloric Acid, ml. | Sodium Bisulfate, grams | Limestone, grams | Gel time, minutes | pH at gel time |
|---|---|---|---|---|
| 8 | 0 | 100 | 27 | 5.0 |
| 8 | 7.29 | 100 | 361 | 1.3 |
| 8 | 7.29 | 200 | 58 | 4.5 |
| 8 | 7.29 | 300 | 49 | 4.5 |
| 8 | 12.00 | 200 | 253 | 1.9 |
| 8 | 12.00 | 300 | 114 | 4.5 |
| 12 | 0 | 100 | 25 | 4.0 |
| 12 | 7.29 | 100 | 210 | 2.5 |
| 12 | 7.29 | 200 | 33 | 4.5 |
| 12 | 7.29 | 300 | 46 | 4.5 |
| 12 | 12.00 | 200 | 241 | 1.7 |
| 12 | 12.00 | 300 | 107 | 3.7 |
| 12 | 18.00 | 300 | 201 | 1.5 |

The foregoing data show that the addition of the sodium bisulfate greatly extends the short gel time caused by the presence of the limestone.

EXAMPLE 2

In this example, the silicic acid solution is injected into a lengthy column of limestone chat. Temperature was about 100–105° C. The limestone was 97% acid soluble and in the form of ¼" pea gravel. The pore system volume for the 16' columns was approximately 2350 ml. and for the 32' columns was 4700 ml. The inside diameter of the columns was approximately 37 mm. Initially the pore volume was filled with a 10% brine solution. The pump rate for the 16' columns was 3530 ml. per minute and 2300 ml. per minute for the 32' columns. Inlet pressure was 50 p.s.i. and the outlet pressure was 15 p.s.i. The acid concentration was 8 ml. of 20° Bé. hydrochloric acid per 100 ml. of silicic acid. The columns were observed for leading edge effect, that is, the formation of gel at the leading edge of the silicic acid as it advanced through the column of chat. The results are shown on the following table:

TABLE II

| Limestone, Column Length, feet | Sodium Bisulfate, grams | Total Volume of Silicic Acid Solution, ml. | Preflush Chemical | Preflush Grams | Preflush Water | Gel Time, minutes |
|---|---|---|---|---|---|---|
| 16 | 0 | 6,000 | 0 | 0 | 0 | a (9 sec.) |
| 16 | 0 | 6,000 | 0 | 0 | 0 | j 9.5 |
| 16 | 219 | 6,000 | 0 | 0 | 0 | 85 |
| 16 | 438 | 6,000 | 0 | 0 | 0 | 153 |
| 16 | 438 | 6,000 | Sodium bisulfate | 480 | 4,000 | i 213 |
| 32 | 729 | 10,000 | 0 | 0 | 0 | b 9 |
| 32 | 729 | 10,000 | Sodium bisulfate | 360 | 3,000 | c 132 |
| 32 | 1,200 | 10,000 | 0 | 0 | 0 | d e 240 |
| 16 | 438 | 6,000 | Oil surfactant | k 40 | f 4,000 | e 240 |
| 16 | 438 | 6,000 | ----do---- | k 40 | h 0 | 62 |
| 16 | 438 | 6,000 | Oxalic acid | 100 | 1,000 | b 333 | a Plugged 8 to 12 feet from the beginning.
b Partially plugged 24 to 28 feet, completely plugged 28 to 32 feet from the beginning.
c Not circulated from 16 to 60 min. due to power failure.
d Pore volume from 28 to 32 feet, 50% gelled.
e The test ended at 240 min., estimated gel time in excess of 300 min.
f Diesel oil substituted for water.
g Considerable emulsion formed but no leading edge effect.
h Oil surfactant was added directly to the silicic acid.
i No leading edge effect, at all, observed.
j 16 ml. 20° Bé. hydrochloric acid per 100 ml. of silicic acid used for this test only.
k Milliliters.

EXAMPLE 3

Plugging of a thief zone in a well bore was carried out on a well having the following characteristics:

Casing: 5½ inch
Tubing: 2⅞ inch
Packer: Baker AD Tension Type set at 6675 ft.
Perforations: 6610 ft.–6666 ft. in the Bois D'Arc formation. 6690 ft.–6836 ft. in the Chimney Hill formation The well was a water flood injection well on 40 acre spacing. A stinger was run on the tubing below the packer to 6830 ft. Fluid level in the tubing sometime prior to May 17 was 6183 ft. A Birdwell tracer survey was run sometime prior to May 17 at an injection rate of 650 BWPD. Casing head gas pressure on the annulus at the time was 25 p.s.i.g. A low density salt water was being injected down tubing. A tracer survey indicated that fluid was entering the formation just below the packer and was going into the zone at and just above the packer. The temperature where the fluid was entering was between 86° F. and 90° F. as indicated by the temperature survey.

Treating procedure

Preflush consisting of:

H₂O ------------------------------------------bbls-- 30
Sodium bisulfate ----------------------------lbs-- 1200

Solution A consisting of:

Sodium silicate grade 40 -----------------drums-- 10
H₂O ------------------------------------------bbls-- 25

Solution B consisting of:

22° Bé. hydrochloric acid ------------------gals-- 224
HAI-45 ¹ ---------------------------------------gals-- 5
H₂O ------------------------------------------bbls-- 32.2
Sodium bisulfate ----------------------------lbs-- 1000

¹ Halliburton corrosion inhibitor for steel in acid.

An additional 400 lbs. of sodium bisulfate were added to each tank containing 18.75 bbls. of Solution B. Another 100 lbs. of sodium bisulfate were added to one tank containing 18.75 bbls. of Solution B while final mixing of Solutions A and B was being carried out in the other tank. A total of 1900 lbs. of sodium bisulfate was mixed into the Solution B. Sodium bisulfate preflush was started into the well at 8:17 a.m. and 30 bbls. were injected at 9:05 a.m. at an average rate of .625 b.p.m.

Final mixing of Solutions A and B was started at 8:45 a.m. and was completed at 9:05 a.m. The final solution of mixed Solutions A and B was started into the well at 9:15 a.m. A Sonolog test to determine fluid level in the casing was run at 9:30 a.m. At a casinghead pressure of 235 p.s.i.g., the fluid level was found at 6675 ft. which was the packer setting. The pressure was bled to 100 p.s.i.g., and at 9:45 a.m., the fluid level was found at 6405 ft.

The following table gives volume measurements in the tank, as determined by stick measurements, time of each measurement, and rate at the indicated time interval.

| Volume (Gal.) | Time (a.m.) | Rate (b.p.m.) (During Time Interval) |
|---|---|---|
| 3,010 | 9:15 | ---------------- |
| 2,790 | 9:25 | .58 |
| 2,570 | 9:35 | .58 |
| 2,425 | 9:45 | .35 |
| 2,150 | 10:05 | .33 |
| 2,075 | 10:10 | .36 |
| 2,050 | 10:11 | .60 |
| 2,025 | 10:12 | .60 |
| 1,815 | 10:22 | .50 |
| 1,700 | 10:32 | .27 |
| 1,625 | 10:42 | .18 |
| 1,300 | 10:47 | 1.55 |
| 800 | 10:57 | 1.20 |
| 625 | 11:02 | .83 |
| 470 | 11:07 | .74 |
| 370 | 11:12 | .48 |
| 330 | 11:16 | .24 |
| 275 | 11:22 | .33 |
| 225 | 11:26 | .30 |

Total average pump rate was .51 b.p.m.

Pumps were used only intermittently to pick up fluid and regulate flow down tubing. Msot of the solution was gravity flowed into the well. Two and one-half barrels of displacement water were pumped. Fluid levels were then run with the Sonolog. When fluid levels were run on the tubing, the tubing pressure was raised to 50 p.s.i.g. with gas.

The following table shows the fluid level in the casing and tubing.

| Time | Casing Pressure (p.s.i.g.) | Applied Tubing Pressure (p.s.i.g.) | Fluid Level in Tubing (ft.) |
|---|---|---|---|
| About 12:00 Noon* | 100 | 50 | 6,161 |
| 12:30 p.m. | 115 | 50 | 5,642 |
| 12:45 p.m. | 100 | 50 | 6,000 |
| 1:00 p.m. | 100 | 50 | 5,978 |
| 1:20 p.m. | 100 | 50 | 5,917 |

*After this fluid level run, pressure was released on the tubing, and an additional 3.0 bbls. of displacement water was run. Pressure on the tubing was again applied with gas until 50 p.s.i.g. was constant. Then the remaining fluid levels were run.

The well was shut-in at 1:20 p.m. on May 17 with 50 p.s.i.g. holding on the tubing and 100 p.s.i.g. casinghead gas pressure on the annulus. Gas was being bled from the annulus to maintain a pressure of 100 p.s.i.g.

Since the fluid level in the tubing remained fairly constant, within the apparent accuracy of the Sonolog, for 35 minutes and was above the original fluid level by almost 200 ft., it is indicated that the material in the formation had started to gel by 1:20 p.m. May 17.

The well was put back on injection at 3:30 p.m. May 18. After 16.5 hours, 437 bbls. of water had been injected. There were 24 inches of vacuum on the tubing.

On May 19, the fluid level in the casing was 5795 ft. at 100 p.s.i.g., and in the tubing it was 6079 ft. with 50 p.s.i.g. on the tubing.

EXAMPLE 4

Following the procedures of Example 1, the following results were obtained:

Solution A: 16.7 ml. grade 40 sodium silicate+33.3 ml. water

Solution B: 12 ml. 20° Bé HCl+38 ml. water+X gms. retarder

Limestone: 100 gms. pea gravel 1/100 ml. mixed solutions A and B

| Test No. | Retarder Acid | X Gms. | Gel Time, Minutes 75° F. | 140° F. | pH at Gel Time 75° F. | 140° F. |
|---|---|---|---|---|---|---|
| 1 | Control | 0 | 78 | 15 | 5.0 | 4.5 |
| 2 | Tartaric | 0.5 | 83 | 38 | 5.0 | 4.0 |
| 3 | do | 1.0 | 65 | 42 | 4.5 | 5.0 |
| 4 | do | 2.0 | 183 | 52 | 5.5 | 3.2 |
| 5 | do | 5.0 | 1,533 | 88 | [1] 2.6 | 1.7 |
| 6 | Phosphoric | 0.5 | 71 | 30 | 4.5 | 4.0 |
| 7 | do | 1.0 | 65 | 35 | 4.0 | 3.0 |
| 8 | do | 2.0 | 262 | 92 | 3.8 | 3.5 |
| 9 | do | 5.0 | 281 | 36 | [2] 3.0 | 3.2 |
| 10 | Sulfuric | 5.0 | 250 | 135 | [3] 4.0 | 3.0 |
| 11 | Oxalic | 0.5 | 75 | 27 | 4.5 | 4.5 |
| 12 | do | 1.0 | 46 | 20 | 5.0 | 4.5 |
| 13 | do | 2.0 | 114 | 40 | 5.0 | 5.0 |
| 14 | do | 5.0 | 156 | 46 | [1] 4.0 | 4.0 |

[1] Initial pH 0.3.
[2] Initial pH 0.2.
[3] Initial pH 0.1.

The foregoing data show that strong acids and strong acid precursors maintain an adequate time for injection in carbonaceous formations before the onset of gellation. However, sealing and plugging solutions do not suffer from any loss of properties when gellation does occur. As will be apparent to those skilled in the art, the compositions of the present invention will be useful in a wide variety of well treating operations, for grouting and the like. For example, the invention is applicable to the consolidation of any loose or incompetent limestone or dolomite formations.

Having fully described the invention, it is intended that it be limited by the lawful scope of the appended claims.

We claim:

1. A method of plugging or sealing carbonaceous earth formations and the like comprising preflushing the formation with a liquid selected from the group consisting of oil, surfactant, surfactant in oil solution, strong acid and strong acid precursor, injecting into the formation to be sealed a silicic acid solution having an initial pH of about 1.5 or less, containing a strong acid or strong acid precursor, said strong acid having an ionization constant of from about $1 \times 10^0$ to $1 \times 10^{-4}$, and being capable of forming an essentially water-insoluble calcium salt, and allowing the silicic acid solution to set into a relatively firm and impermeable mass, thereby sealing said formation.

2. The method of claim 1 wherein the formation is preflushed with oil.

3. The method of claim 1 wherein the formation is preflushed with a surfactant in an oil solution.

4. The method of claim 1 wherein the formation is preflushed with a surfactant.

5. The method of claim 1 wherein the formation is preflushed with a solution of said strong acid or precursor.

6. The method of claim 1 wherein said strong acid is sulfuric acid.

7. The method of claim 1 wherein said precursor is sodium bisulfate.

8. The method of claim 1 wherein said calcium salt has a water solubility of less than about 2 grams per 100 ml. of water.

9. A method of plugging or sealing carbonaceous earth formations and the like comprising preflushing the formation with a fluid comprising a strong acid or a strong acid precursor, said strong acid having an ionization constant of from about $1 \times 10^0$ to $5 \times 10^{-4}$, and being capable of forming an essentially water-insoluble calcium salt, thereafter injecting into the formation to be sealed a silicic acid solution having an initial pH of about 1.5 or less and allowing the silicic acid solution to set into a relatively firm and impermeable mass, thereby sealing the formation.

10. The method of claim 9 wherein said strong acid is sulfuric acid.

11. The method of claim 9 wherein said precursor is sodium bisulfate.

12. The method of claim 9 wherein said calcium salt has a water solubility of less than about 2 grams per 100 ml. of water.

References Cited

UNITED STATES PATENTS

| 2,081,541 | 5/1937 | Joosten | 61—36 |
| 2,176,266 | 10/1939 | Malmberg | 61—36 |
| 2,207,759 | 7/1940 | Reimers | 166—21 |
| 2,227,653 | 1/1941 | Langer | 61—36 |
| 2,236,147 | 3/1941 | Lerch et al. | 61—36 |
| 2,281,810 | 5/1942 | Stone et al. | 61—36 |
| 2,330,145 | 9/1943 | Reimers | 166—22 |
| 2,731,090 | 1/1956 | Johnston | 166—42 X |
| 3,319,714 | 5/1967 | Knox | 166—42 |

STEPHEN J. NOVOSAD, *Primary Examiner.*